US011285566B2

(12) United States Patent
Tanaka et al.

(10) Patent No.: US 11,285,566 B2
(45) Date of Patent: Mar. 29, 2022

(54) LASER MACHINING APPARATUS

(71) Applicant: HONDA MOTOR CO., LTD., Tokyo (JP)

(72) Inventors: Toshiyuki Tanaka, Tochigi (JP); Kazuhide Matsuo, Tochigi (JP); Shinichi Miyasaka, Tochigi (JP); Satoshi Oyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 16/492,866

(22) PCT Filed: Feb. 8, 2018

(86) PCT No.: PCT/JP2018/004337
§ 371 (c)(1),
(2) Date: Sep. 10, 2019

(87) PCT Pub. No.: WO2018/168270
PCT Pub. Date: Sep. 20, 2018

(65) Prior Publication Data
US 2020/0276671 A1 Sep. 3, 2020

(30) Foreign Application Priority Data
Mar. 14, 2017 (JP) .............................. JP2017-048899

(51) Int. Cl.
*B23K 26/38* (2014.01)
*B23K 26/142* (2014.01)
(Continued)

(52) U.S. Cl.
CPC .......... *B23K 26/38* (2013.01); *B23K 26/0648* (2013.01); *B23K 26/142* (2015.10);
(Continued)

(58) Field of Classification Search
CPC .. B23K 26/38; B23K 26/142; B23K 26/0648; B23K 26/1464; B23K 26/14; B23K 26/36
(Continued)

(56) References Cited

U.S. PATENT DOCUMENTS 6,627,843 B2 * 9/2003 Itakura .................... H01S 3/225
219/121.69

FOREIGN PATENT DOCUMENTS

| JP | S59-94823 A | 5/1984 |
| JP | S62-053190 B2 | 11/1987 |

(Continued)

OTHER PUBLICATIONS

Machine English Translation of JP-H07196303-A (Year: 1995).*
(Continued)

*Primary Examiner* — Sang Y Paik
*Assistant Examiner* — Erwin J Wunderlich
(74) *Attorney, Agent, or Firm* — Carrier Blackman & Associates, P.C.; William D. Blackman; Joseph P. Carrier

(57) ABSTRACT

A laser machining apparatus 1 includes: a laser head that is supported by a laser moving device so as to be movable in X, Y, and Z directions above a motor driven conveyor that transports a workpiece loaded thereon. The laser head includes protection glass for protecting a laser focusing lens; an ultraviolet irradiation device disposed beside the conveyor such that a laser light axis and an ultraviolet ray axis are parallel to each other; and a control device that controls the components of the laser machining apparatus so that the ultraviolet irradiation device radiates UV rays on the protection glass in a state in which a UV irradiation port faces a laser irradiation port of the laser head, thus cleaning the protection glass without removing it from the laser head.

4 Claims, 7 Drawing Sheets

(51) Int. Cl.
  *B23K 26/14*    (2014.01)
  *B23K 26/36*    (2014.01)
  *B23K 26/06*    (2014.01)

(52) U.S. Cl.
  CPC .......... *B23K 26/1464* (2013.01); *B23K 26/14* (2013.01); *B23K 26/36* (2013.01)

(58) Field of Classification Search
  USPC ........................................ 219/121.67, 121.68
  See application file for complete search history.

(56) References Cited

FOREIGN PATENT DOCUMENTS

| | | |
|---|---|---|
| JP | H04-009373 B2 | 2/1992 |
| JP | H07196303 A * | 8/1995 |
| JP | H11285884 A * | 10/1999 |
| JP | 2001150173 A * | 6/2001 |
| JP | 2002-066781 A | 3/2002 |
| JP | 2002-088178 A | 3/2002 |
| JP | 2013-022601 A | 2/2013 |
| JP | 2014-083591 A | 5/2014 |
| JP | 2015-009270 A | 1/2015 |
| KR | 20050105000 A * | 11/2005 |

OTHER PUBLICATIONS

Machine English Translation of JP-H11285884-A (Year: 1999).*
Machine English Translation of JP-2001150173-A (Year: 2001).*
Machine English Translation of KR-20050105000-A (Year: 2005).*
Office Action dated Sep. 25, 2020 issued in the corresponding Chinese Patent Application No. 201880017095.4.

* cited by examiner

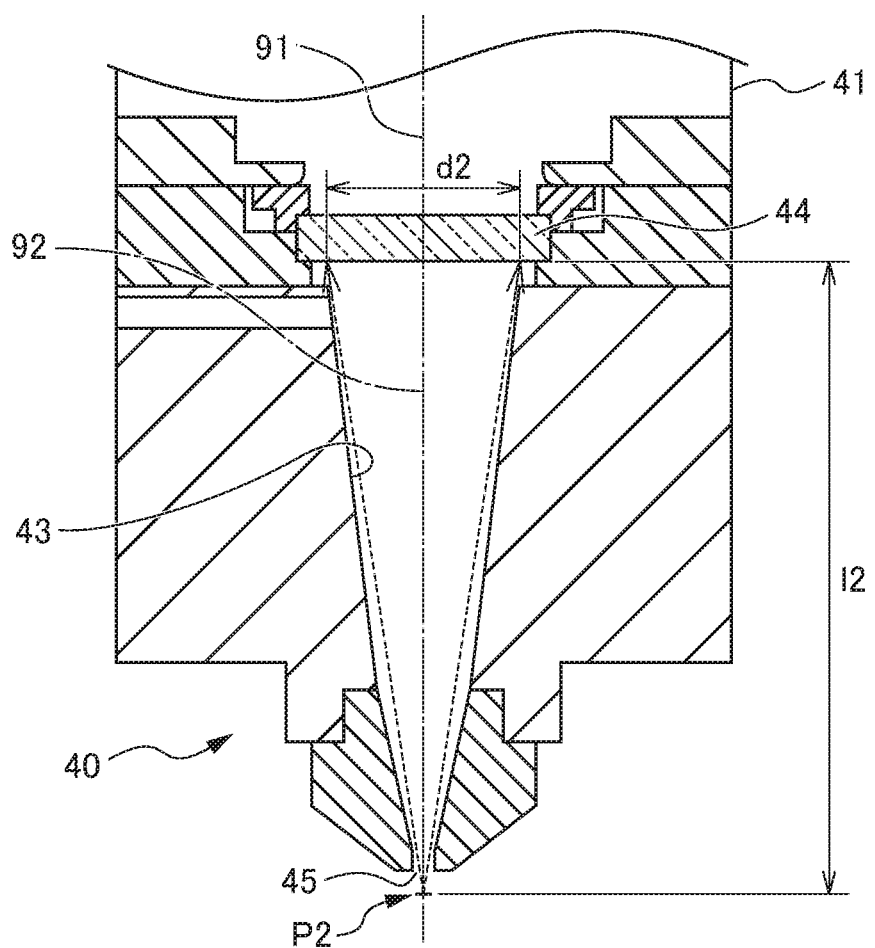

LASER MACHINING APPARATUS

TECHNICAL FIELD

The present invention relates to a laser processing machine that irradiates a workpiece with a laser.

BACKGROUND ART

In related art, there has been known a technique of decomposing organic matters adhering to a target by ultraviolet rays radiated from an ultraviolet irradiation device and performing cleaning. For example, Patent Documents 1 to 3 disclose this kind of technique.

Patent Document 1 discloses an ultraviolet irradiation device in which an object to be cleaned to which an organic contaminant adheres and a gas to be cleaned containing an organic contaminant coexists with oxygen gas, and an ultraviolet lamp which emits beam having a wavelength of 185 nm and 254 nm is disposed to face the organic contaminants and oxygen gas, and when the outputs of beam of 185 nm and 254 nm are defined as $I_{185}$ and $I_{254}$, $I_{185}/I_{254}$ is set in the range of 0.08 to 0.3. Patent Document 2 discloses a method for modifying a surface of a transparent plastic member in which the surface of the transparent plastic member is irradiated with ultraviolet rays having wavelengths of 185 nm and 254 nm and light intensity of 1 to 3,000 mJ/cm$^2$. Patent Document 3 discloses a technique in which, in a technique of decomposing ozone or $N_2O$ (nitrous oxide) with light from an ultraviolet source, decomposing, by oxygen of a generating group generated by the decomposing described above, an organic contaminant or the like adhering to a surface of an object to be processed, and performing a process of cleaning or the like, quartz glass or an air curtain is provided as a partition between the ultraviolet source and a workpiece, oxygen is supplied toward the workpiece side, and the infrared source side is in a vacuum environment or in a gas ($N_2$) atmosphere which does not absorb an infrared ray.

Patent Document 1: Japanese Examined Patent Application Publication No. H4-9373
Patent Document 2: Japanese Unexamined Patent Application, Publication No. 2002-88178
Patent Document 3: Japanese Examined Patent Application Publication No. S62-53190

DISCLOSURE OF THE INVENTION

Problems to be Solved by the Invention

Incidentally, in the laser processing machine, since a laser of high energy density is radiated to a processing point, a processed material instantaneously melts and vaporizes. Therefore, contamination of organic matters in which scattering of high-temperature and high-speed spatter, generation of plasma, steam of rust preventive oil on the surface of processed material, and the like occur adheres to a protective glass for protecting the focus glass. Even if the scattering spatter enters a laser head, since it is decelerated by the gas discharged at high pressure from the distal end of the laser head, it is possible to greatly reduce the probability of adhesion to glass. However, a very small amount of fume may deposit on the protective glass and clouding may occur on the glass. In this case, replacement of protective glass is necessary.

In order to replace the protective glass, it is necessary to stop an operation of the laser processing machine. In addition, in a field of laser processing, an increase in cutting speed advances, and a decrease in transmittance of the protective glass is also accelerating. Hence, there is a concern that, when contamination of the protective glass remains as it is, a cutting defect will occur, and thus it is necessary to frequently (for example, once every few days) replace the protective glass. A long time taken for replacement work of the protective glass results in a decrease in operation rate of the laser processing machine, and thus contaminants can enter the laser head during the replacement work of the protective glass.

An object of the present invention is to provide a laser processing machine in which protective glass can be cleaned without being removed from a laser head, and thus a high operation rate is achieved.

Means for Solving the Problems

The present invention relates to a laser processing machine (for example, a laser processing machine 1 to be described below) including: a laser head (for example, a laser head 40 to be described below) that is supported by a moving mechanism (for example, a laser moving device 20 to be described below) so as to be movable in X, Y, and Z directions above a workpiece conveying device (for example, a conveyor 10 to be described below) that transports, by means of a driving mechanism (for example, a conveyor drive motor 11 to be described below), a workpiece (for example, a workpiece W to be described below) loaded thereon, the laser head having, inside thereof, protective glass (for example, protective glass 44 to be described below) for protecting a laser focus lens (for example, a focus lens 42 to be described below); an ultraviolet irradiation device (for example, an ultraviolet irradiation device 50 to be described below) disposed above the workpiece conveying device or beside the workpiece conveying device such that a laser beam axis (for example, a laser beam axis 91 to be described below) of laser light that is radiated from the laser head and an ultraviolet beam axis (for example, an ultraviolet beam axis 92 to be described below) of ultraviolet rays to be radiated are parallel to each other; and a control device (for example, a control device 70 to be described below) that controls the driving mechanism, the moving mechanism, and the ultraviolet irradiation device. The control device controls the moving mechanism to cause the ultraviolet irradiation device to radiate ultraviolet rays on the protective glass in a state in which an ultraviolet irradiation port (for example, an ultraviolet irradiation port 51 to be described below) faces a laser irradiation port (for example, a laser irradiation port 45 to be described below) of the laser head and thus to clean the protective glass without removing the protective glass from the laser head. With this configuration, it is possible to restore transmittance by removing contamination of the protective glass without removing the protective glass from the laser head. Therefore, cleaning work of the protective glass can be performed, using the idle time of the laser processing machine during which laser irradiation is not performed. Since the time required for a cleaning process of the protective glass can be shortened considerably, it is not necessary to stop an operation of the laser processing machine, and an operation rate of the laser processing machine can be improved.

Preferably, the ultraviolet irradiation device radiates ultraviolet rays on the protective glass from the same position as a laser processing point of the laser head or a position closer to the protective glass than that position. With this configuration, it is possible to reliably radiate ultraviolet rays over the entire range of the contamination of the protective glass caused by the laser irradiation, and it is possible to further restore the transmittance.

Preferably, the laser head, inside thereof, has a flow path (for example, a flow path 43 to be described below) for supplying a cutting gas (for example, $N_2$ to be described below) which is injected during processing, and a cutting gas is supplied during laser irradiation, and supply of the cutting gas is stopped during ultraviolet irradiation. With this configuration, active oxygen is generated, oxidation and volatilization of organic matter can be promoted, and the cleaning effect can be further improved.

Preferably, a cleaning gas flow path (for example, a cleaning gas flow path 60 to be described below) is connected, via a switchover valve (for example, a switchover valve 61 to be described below), to the flow path for supplying the cutting gas and, during the ultraviolet irradiation, a cleaning gas is introduced from the cleaning gas flow path and the cutting gas is discharged from inside of the flow path. With this configuration, active oxygen is further generated, oxidation and volatilization of the organic matter can be promoted, it is possible to restore the transmittance of the protective glass with a high cleaning effect during the ultraviolet irradiation, and it is possible to prevent entry of contaminants into the laser head during cleaning.

Preferably, the ultraviolet irradiation by the ultraviolet irradiation device is performed in an idle time during which the workpiece is not cut by the laser irradiation. With this configuration, the cleaning process of the protective glass is performed, using a time during which the laser irradiation is not performed, and thus it is possible to further improve the operation rate. For example, the cleaning process is to be performed in a break time of an operator or during switching work of the workpiece, and thereby it is possible to perform the cleaning process of the protective glass automatically and regularly without specially securing a time for the cleaning process.

Effects of the Invention

According to the laser processing machine of the present invention, the protective glass can be cleaned without being removed from the laser head, and thus a high-level operation rate is realized.

BRIEF DESCRIPTION OF THE DRAWINGS

FIG. 7 is a schematic view illustrating an optical path in a case in which the optical path diameter is relatively large and the distance from the protective glass to the processing point is short, in the laser head of the present embodiment.

PREFERRED MODE FOR CARRYING OUT THE INVENTION

Figure 1:
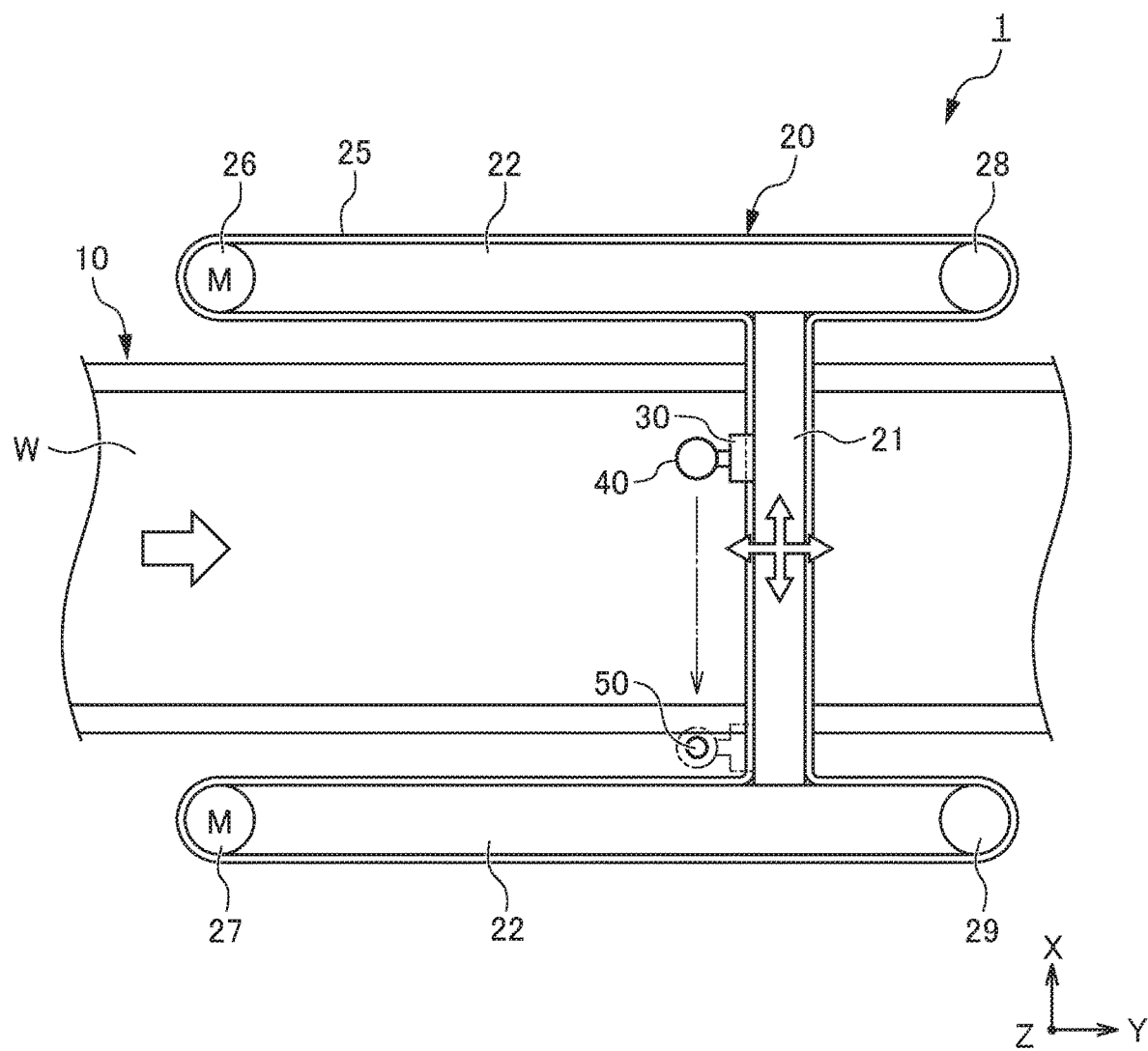
FIG. 1 is a plan view schematically illustrating a laser processing machine according to an illustrative embodiment of the present invention.
Figure 2:
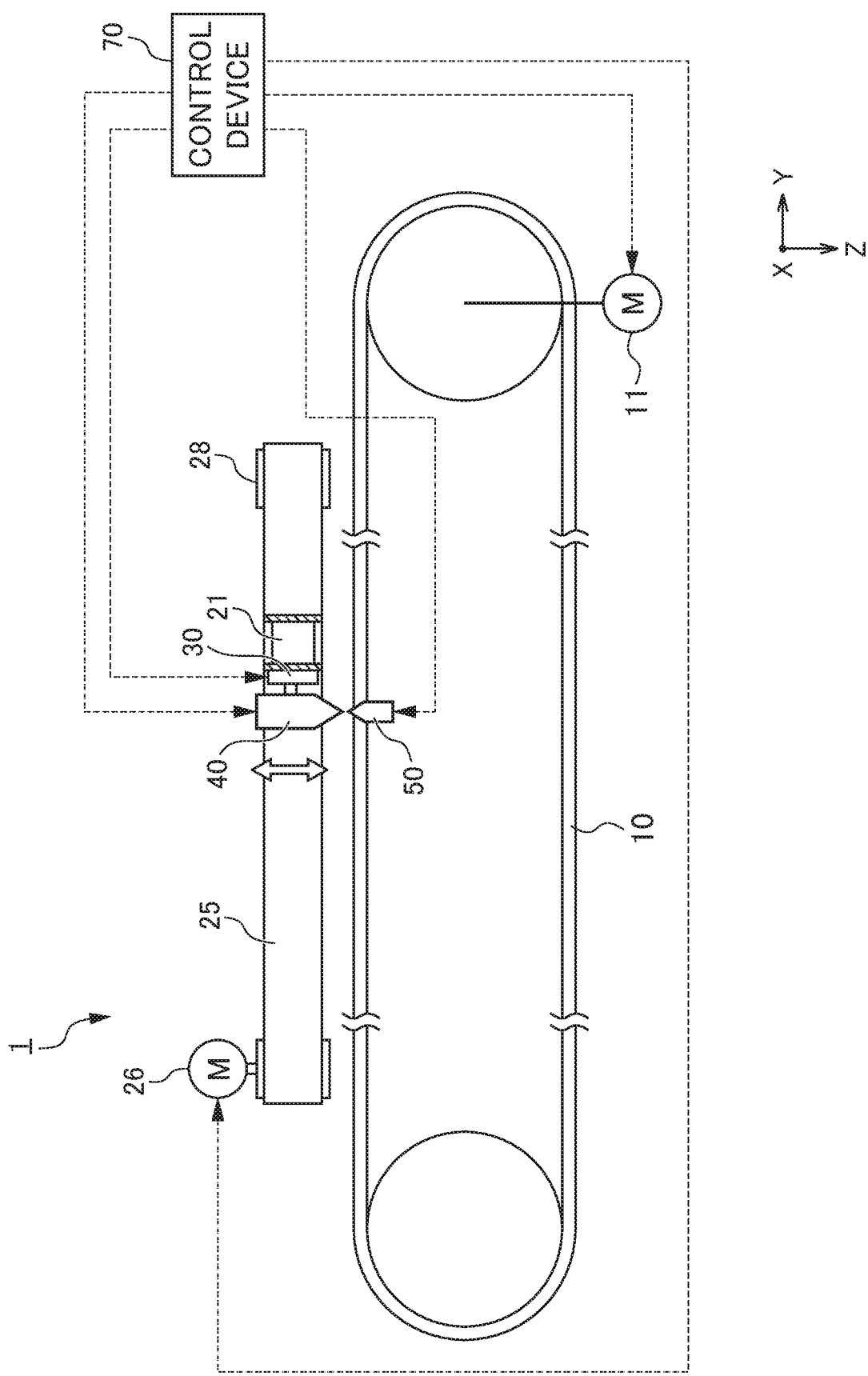
FIG. 2 is a side view schematically illustrating the laser processing machine of the present embodiment.

Hereinafter, preferred embodiments of the present invention will be described with reference to the drawings. FIG. 1 is a plan view schematically illustrating a laser processing machine 1 according to an illustrative embodiment of the present invention. FIG. 2 is a side view schematically illustrating the laser processing machine 1 of the present embodiment.

The laser processing machine 1 illustrated in FIGS. 1 and 2 is used for a laser blanking system which cuts (blanks) a workpiece W with lasers in accordance with different shapes depending on objects to be processed and sends them to a subsequent process. The workpiece W to be processed by the laser processing machine 1 is, for example, a steel plate of a side panel for an automobile, or the like.

First, an overall configuration of the laser processing machine 1 will be described. The laser processing machine 1 of the present embodiment mainly includes a conveyor 10, a laser moving device 20, a laser head 40, an ultraviolet irradiation device 50, and a control device 70.

The conveyor 10 is a workpiece conveying device that conveys the workpiece W from an upstream side to a downstream side (a Y-axis direction in FIG. 1). The conveyor 10 is constituted by an endless belt that rotates by the driving force of a conveyor drive motor 11. In the present embodiment, the workpiece W that has passed through an uncoiler and a leveler (both of which are not illustrated) is placed on the upper surface of the conveyor 10 and is conveyed to the processing position.

The laser moving device 20 is a moving mechanism that supports the laser head 40 so as to be movable in the XYZ direction above the conveyor 10.

The laser moving device 20 of the present embodiment includes a first frame 21 extending in a direction (an X-axis direction) orthogonal to a conveyance direction of the conveyor 10, a pair of second frames 22 which supports the conveyor 10 so as to be movable in the conveyance direction (a Y-axis direction), an endless belt 25 wound around the side surfaces of the first frame 21 and the second frame 22, servo motors 26 and 27 which drive the endless belt 25, pulleys 28 and 29 rotating on the inside of the endless belt 25, and an elevating mechanism 30 fixed to the endless belt 25 and supporting the laser head 40.

The endless belt 25 is wound in a substantially H shape in a plan view, and by combination of the rotation of the servo motors 26 and 27, the laser head 40 held by the elevating mechanism 30 can move in a planar direction (an XY direction).

For example, by controlling the two servo motors 26 and 27 at the same speed with the same rotational direction, the endless belt 25 moves in the same direction as the rotation direction of the servo motors 26 and 27, and the laser head 40 held by the elevating mechanism 30 moves in the X-axis direction. At this time, the first frame 21 does not move in the Y-axis direction due to the equilibrium of rotational speeds of the two servo motors 26 and 27. Further, when moving the first frame 21 in the Y-axis direction, the servo motor 26 (or the servo motor 27) on one side is rotated clockwise at a predetermined speed, and the servo motor 27 (or the servo motor 26) on the other side is rotated counterclockwise at the same predetermined speed. Therefore, the laser head 40 held by the elevating mechanism 30 moves in the Y-axis direction depending on the rotation direction of the servo motors 26 and 27. At this time, the laser head 40 does not move in the X-axis direction due to the equilibrium of the predetermined speed. It is also possible to move the laser head 40 in the Y-axis direction, while moving in the X-axis direction by controlling the rotation direction and rotation speed of the servo motors 26 and 27.

The movement of the laser head 40 in a vertical direction (a Z direction) is performed by the elevating mechanism 30. The servo motors 26 and 27 and the elevating mechanism 30 allow the laser head 40 to move in three dimensions (XYZ directions).

Next, the configuration of the laser head 40 will be described. The laser head 40 radiates a laser beam to the workpiece W placed on and conveyed by the conveyor 10 to cut and process the workpiece in a preset shape. In cutting using the laser, the workpiece (a steel plate) W is locally melted by a laser, and the molten metal is eliminated by $N_2$ as a cutting gas, thereby fusing the workpiece W without oxidation. The laser head 40 of the present embodiment outputs a Yb fiber laser having a wavelength of 1,070 nm.

Figure 3:
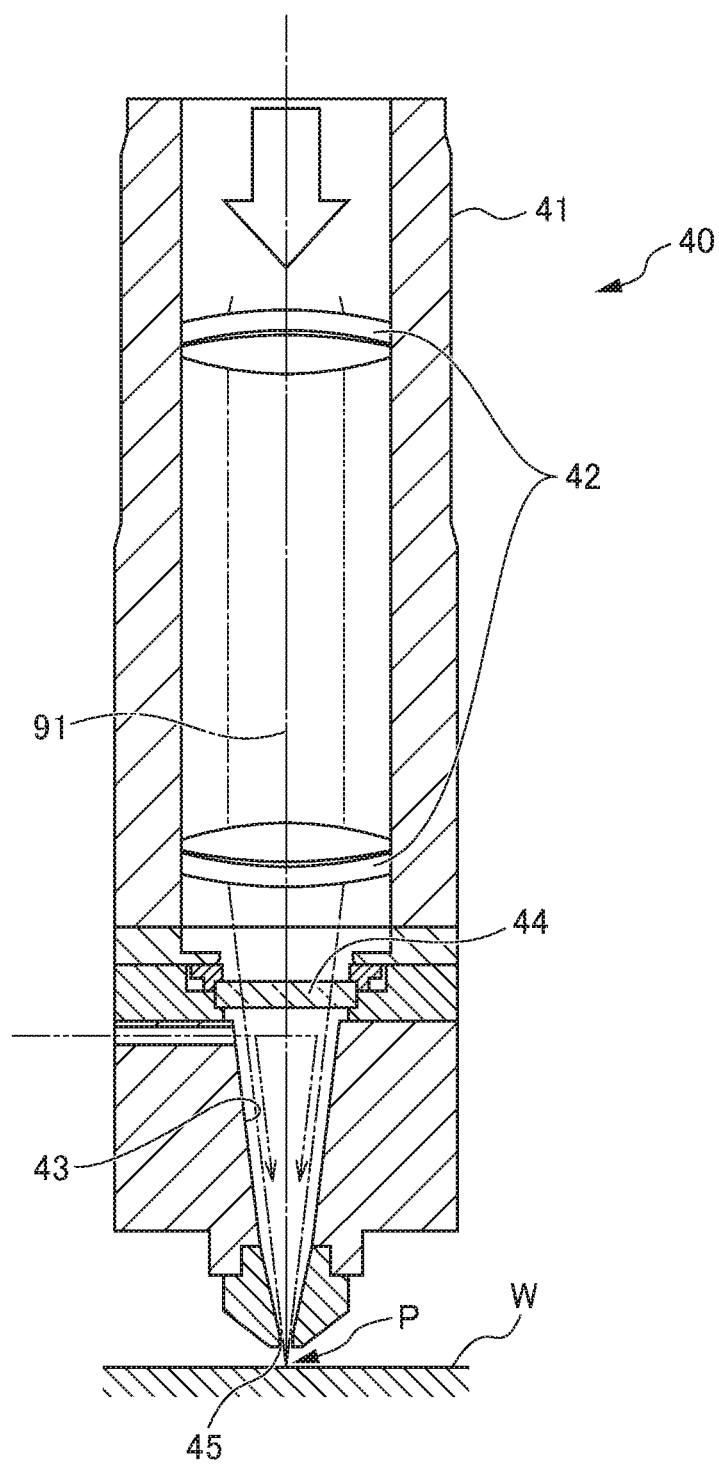
FIG. 3 is a cross-sectional view schematically illustrating an internal configuration of a laser head of the present embodiment.

FIG. 3 is a cross-sectional view schematically illustrating an internal configuration of the laser head 40 of the present embodiment. In FIG. 3, the laser focused by a focus lens 42, which will be described later, is schematically illustrated by a one-dot chain line, and the flow of $N_2$ as a cutting gas is schematically illustrated by a two-dot chain line.

The laser head 40 of the present embodiment includes a main body 41 having a laser irradiation port 45 formed at a distal end thereof, the focus lens 42 disposed inside the main body 41, a flow path 43 for guiding $N_2$ to a processing target, a protective glass 44 for protecting the focus lens 42, and a light source (not illustrated) for supplying a laser to the focus lens 42 inside the main body 41.

The focus lens 42 is an optical system that focuses the laser on the processing target (a cut portion). The flow path 43 is formed on the same axis as a laser beam axis 91 collected by the focus lens 42. Laser irradiation (one-dot chain line of FIG. 3) is performed, while causing the $N_2$ gas (two-dot chain line of FIG. 3) supplied from a gas supply source (not illustrated) to flow through the flow path 43. The laser head 40 moves along a preset moving locus, while keeping the distance between the laser head 40 and the processing point P of the workpiece W constant, thereby cutting the workpiece W into a desired shape.

The protective glass 44 prevents adhesion of spatter, fumes, impurities and the like floating up from the surface of the steel material to prevent the occurrence of failures such as deterioration of light condensing properties due to contamination of the focus lens 42, degradation of cutting ability, and melting loss of the focus lens 42 itself. The protective glass 44 is disposed between the focus lens 42 and the processing target. As the protective glass 44 of the present embodiment, a flat plate made of quartz glass is used, and an antireflection coating is applied to the surface to suppress energy loss due to surface reflection.

Next, the ultraviolet irradiation device 50 will be described. The ultraviolet irradiation device 50 is a cleaning apparatus that irradiates the protective glass 44 with ultraviolet rays while the laser irradiation is not performed, and performs a cleaning process of the protective glass 44.

A disposed position of the ultraviolet irradiation device 50 will be described. As illustrated in FIG. 1, the ultraviolet irradiation device 50 of the present embodiment is disposed on the side of the conveyor 10, in a position that does not overlap the conveying path of the workpiece W. When the cleaning processing of the protective glass 44 using the ultraviolet irradiation device 50 is performed, the laser head 40 moves to a cleaning position (a position illustrated by the chain line of FIG. 1) by the laser moving device 20. In a state in which the laser head 40 is moved to the cleaning position, ultraviolet rays from the ultraviolet irradiation device 50 are radiated to decompose contamination adhering to the protective glass 44.

The ultraviolet rays radiated by the ultraviolet irradiation device 50 have desirably a short wavelength. In the present embodiment, the ultraviolet irradiation device 50 in which a xenon lamp having an ultraviolet wavelength of 254 nm (a range of 200 to 600 nm), a rating of 280 VA and an ultraviolet illuminance of 3,500 mW/cm$^2$ is set as a light source is used.

Figure 4:
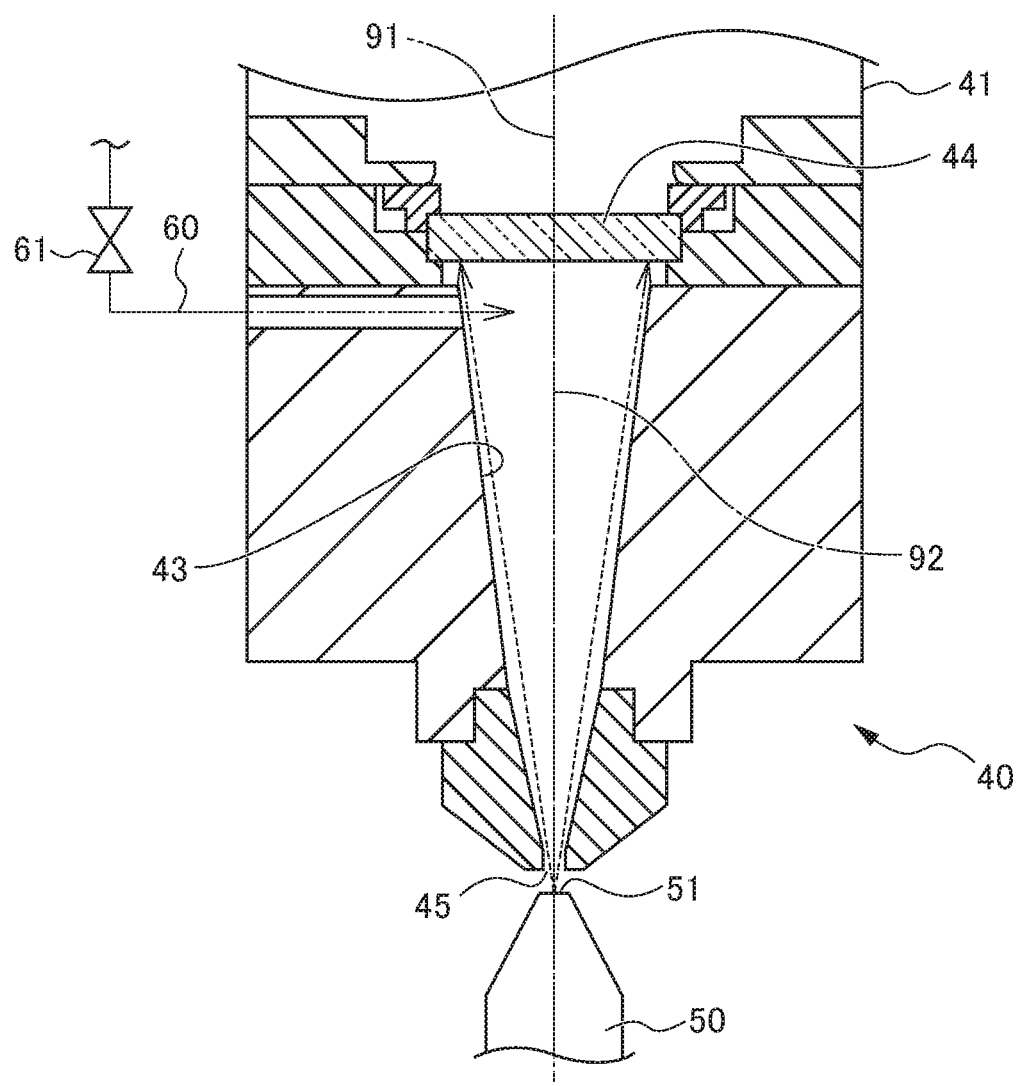
FIG. 4 is an enlarged cross-sectional view schematically illustrating an aspect in which the laser head of the present embodiment moves to a cleaning position facing an ultraviolet irradiation device.

FIG. 4 is an enlarged cross-sectional view schematically illustrating a state in which the laser head 40 of the present embodiment moves to a cleaning position facing the ultraviolet irradiation device 50. In FIG. 4, the ultraviolet ray from the ultraviolet irradiation device 50 is schematically illustrated by a broken line, and the flow of the cleaning gas is schematically illustrated by a two-dot chain line.

As illustrated in FIG. 4, at the cleaning position, the laser irradiation port 45 of the laser head 40 is in a state of facing the ultraviolet irradiation port 51 of the ultraviolet irradiation device 50, and there is a positional relation in which the laser beam axis 91 and the ultraviolet beam axis 92 substantially coincides with each other.

In the laser head 40 of the cleaning position, the position of the ultraviolet irradiation port 51 of the ultraviolet irradiation device 50 is located at the same position as the processing point (the processing focus) P of the workpiece W or on the side closer to the protective glass 44 than that position. The laser head 40 is controlled to come to the cleaning position by the laser moving device 20.

In the embodiment, a cleaning gas flow path 60 is connected to the flow path 43 of the laser head 40. The cleaning gas flow path 60 is provided to purge, from the flow path 43, the $N_2$ gas supplied during the laser processing, and air containing oxygen is supplied as a cleaning gas. In the cleaning gas flow path 60, a switchover valve 61 for switching between supply and stop of the cleaning gas is disposed. The switchover valve 61 is electrically connected to the control device 70, and the opening/closing timing thereof is controlled by the control device 70.

Next, the control device 70 will be described. The control device 70 is a computer including a CPU, a memory, a storage device, and the like, and is electrically connected to each configuration of the laser processing machine 1. The control device 70 controls the movement of the laser head 40 by the aforementioned laser moving device 20, the laser irradiation, the conveyance of the conveyor 10, the cleaning process by the ultraviolet irradiation device 50, and the like.

The control device 70 of the embodiment controls the timing of the cleaning process so that the cleaning process of the protective glass 44 is performed by using the ultraviolet irradiation device 50 in a time (idle time) during which the workpiece W is not cut by the laser irradiation. Although the transmittance decreases as the laser irradiation time increases, the glass transmittance is restored by performing cleaning using the ultraviolet irradiation device 50 during the idle time of the equipment.

At the cleaning process start timing, the control device 70 causes the laser moving device 20 to move the laser head 40 to the cleaning position and opens the switchover valve 61 to send the cleaning gas to the flow path 43 from the cleaning gas flow path 60 (two-dot chain line in FIG. 4). Further, the control device 70 discharges $N_2$ to the outside of the laser head 40 and sends oxygen into the flow path 43.

In a state in which the laser head 40 is located at the cleaning position, ultraviolet rays are radiated by the ultraviolet irradiation device 50 for a predetermined time (a broken line of FIG. 4), and the decomposition treatment of contamination of organic matter of the protective glass 44 is performed to restore the transmittance of the protective glass 44. The time for ultraviolet irradiation is, for example, 45 minutes. Oxygen is present in the flow path 43 due to the cleaning gas, and thus it is possible to perform decomposition treatment of organic matter in a favorable condition.

Figure 5:
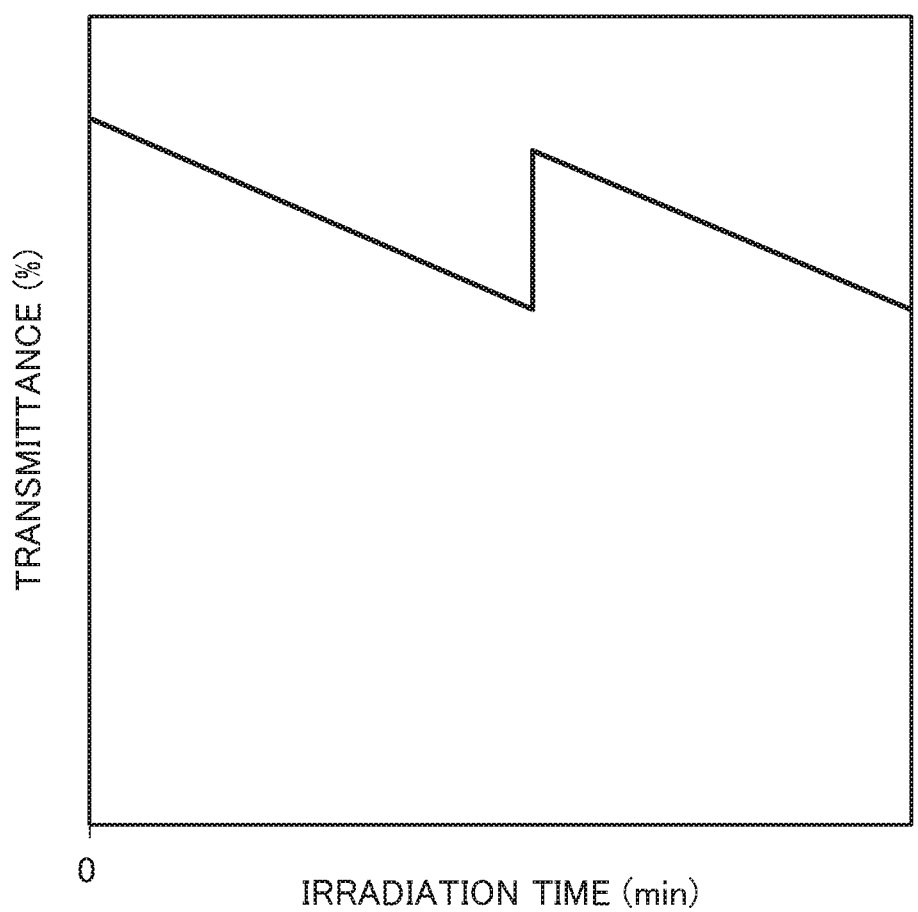
FIG. 5 is a graph illustrating a relation between an irradiation time and the transmittance of the protective glass illustrating the timing at which the cleaning treatment using the ultraviolet irradiation device of the present embodiment is performed.

For example, as illustrated in FIG. 5, the control device 70 performs the cleaning process at an appropriate timing during laser processing so that the transmittance of the protective glass 44 becomes equal to or greater than a predetermined reference. As a result, the transmittance of the protective glass 44 is restored by cleaning before reaching the lifetime. As described above, the control device 70 of the present embodiment has an automatic cleaning function of cleaning the protective glass 44 while the processing is not being performed.

Incidentally, a trigger for starting the cleaning process may be performed automatically according to the schedule or may be configured such that the cleaning process is started by the operation of the user. Further, although the cleaning process is performed during the non-operating time, by setting the cleaning process at the switching work of the supply source of the workpiece W or the break time of the user (for example, a lunch break time), it is possible to reduce the time for which the work cannot be performed by cleaning of the protective glass 44, and to further improve the operation rate.

According to the aforementioned present embodiment, the following effects are obtained. The laser processing machine 1 includes: the laser head 40 that is supported by the laser moving device 20 so as to be movable in the X, Y, and Z directions above the conveyor 10 that transports, by means of the conveyor drive motor 11, the workpiece W loaded thereon, the laser head 40 having, inside thereof, the protective glass 44 for protecting the laser focus lens 42; the ultraviolet irradiation device 50 disposed above the conveyor 10 or beside the conveyor 10 such that the laser beam axis 91 and the ultraviolet beam axis 92 are parallel to each other; and the control device 70 that controls the components of the laser processing machine 1. By controlling the laser moving device 20, the control device 70 causes the ultraviolet irradiation device 50 to radiate ultraviolet rays on the protective glass 44 in a state in which the ultraviolet irradiation port 51 faces the laser irradiation port 45 of the laser head 40, thus cleaning the protective glass 44 without removing the protective glass 44 from the laser head 40. With this configuration, it is possible to restore the transmittance by removing contamination of the protective glass 44 without extracting from the main body 41 of the laser head 40. Therefore, the cleaning work of the protective glass 44 can be performed, using the non-operating time of the laser processing machine 1 during which the laser irradiation is not performed. Since the time required for the cleaning process of the protective glass 44 can be shortened considerably, it is not necessary to stop the operation of the laser processing machine 1, and the operation rate of the laser processing machine 1 can be improved.

Further, in the present embodiment, the ultraviolet irradiation device 50 radiates ultraviolet rays toward the protective glass 44 from the same position as the processing point P of the laser of the laser head 40 or a position closer to the protective glass 44 than that position. With this configuration, it is possible to reliably radiate ultraviolet rays over the entire range of the contamination of the protective glass 44 caused by the laser irradiation, and it is possible to further restore the transmittance.

Further, in the present embodiment, the laser head 40 has a flow path 43 which supplies $N_2$ as a cutting gas to be injected toward the workpiece together with the laser inside the laser head 40 at the time of processing, supplies $N_2$ at the time of laser irradiation, and stops the supply of the cutting gas at the time of ultraviolet irradiation. With this configuration, active oxygen is generated at the time of ultraviolet irradiation, oxidation and volatilization of organic matters can be promoted, and the cleaning effect can be further improved.

In addition, in the embodiment, the cleaning gas flow path 60 is connected, via the switchover valve 61, to the flow path 43 for supplying the cutting gas and, during the ultraviolet irradiation, the cleaning gas is introduced from the cleaning gas flow path 60 and $N_2$ is discharged from the inside of the flow path. Therefore, active oxygen can be reliably present in the flow path 43, oxidation and volatilization of organic matters can be further promoted, a high cleaning effect can be realized at the time of ultraviolet irradiation, and it is possible to prevent entry of contaminants into the laser head 40 during cleaning.

In addition, in the embodiment, the ultraviolet irradiation by the ultraviolet irradiation device 50 is performed in the idle time during which the workpiece W is not cut by the laser irradiation. Therefore, the cleaning process of the protective glass 44 is performed, using the time during which the laser irradiation is not performed, and thus it is possible to further improve the operation rate. For example, the cleaning process is to be performed in a break time of an operator or during switching work of the workpiece W, and thereby it is possible to perform the cleaning process of the protective glass 44 automatically and regularly without specially securing a time for the cleaning process.

Next, a mechanism of contamination adhesion to the protective glass 44 will be described. The inventors confirmed generation of a large amount of plasma and high-speed spatter at the processing point on which the laser focuses, by an image acquisition apparatus such as a high-speed camera, confirmed generation of ultraviolet rays having high intensity at the processing point, by a sensor, and presumed that the ultraviolet rays from the processing point that is irradiated, due to the plasma generated during the laser processing, caused a thin film of lubricant fume or the like entering the inside of the laser head 40 to be formed (deposited) on the protective glass 44 by a light chemical vapor deposition (CVD) effect.

Figure 6:
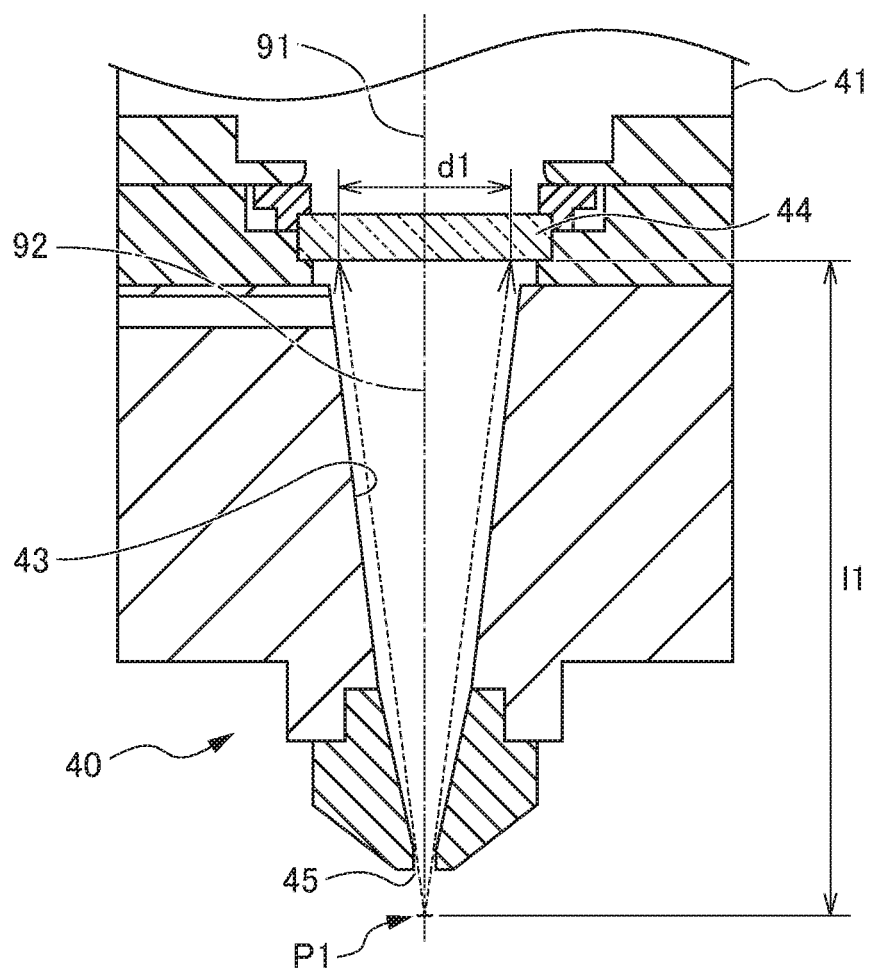
FIG. 6 is a schematic view illustrating an optical path in a case in which an optical path diameter is relatively small and the distance from the protective glass to the processing point is long, in the laser head of the present embodiment.

FIG. 6 is a schematic view illustrating an optical path in a case in which an optical path diameter d1 is relatively small and a distance l1 from the protective glass 44 to a processing point P1 is long, in the laser head 40 of the present embodiment. In addition, FIG. 7 is a schematic view illustrating an optical path in a case in which an optical path diameter d2 is relatively large and a distance l2 from the protective glass 44 to a processing point P2 is short, in the laser head 40 of the present embodiment. Incidentally, d1<d2, and a relationship of l1>l2 is established.

A contamination diameter was defined as a range of contamination on the protective glass 44 and, as a result of comparison between an observed value and a calculated value in a relationship between the contamination diameter and the distance from the protective glass 44 to the processing point P, a calculated value of the optical path diameter of the ultraviolet ray was equal to the contamination diameter.

From the fact that the calculated value of the optical path diameter of the ultraviolet ray is equal to the contamination diameter, the contamination is considered to be deposited on the protective glass 44 by the light CVD effect due to the ultraviolet rays from the processing point. The contamination deposited on the protective glass 44 by the light CVD effect contains organic matter. In an environment in which contamination is not deposited by the light CVD effect, it is possible to perform decomposition removal by radiating extra ultraviolet rays. Incidentally, a central portion of the protective glass 44 is considered to be thermally cleaned with high energy of the center of the laser.

From analysis described above, the following was found. The matters adhering on the protective glass 44 were volatile substances of the rust preventive oil component applied to the surface of the workpiece W. Further, the adhesion range coincided with the optical path of the ultraviolet ray caused by the plasma generated at the processing point. Therefore, it is considered that the vapor of the rust preventive oil which entered the laser head 40 in a minute amount is deposited on the optical path of the ultraviolet ray from the processing point as a result of the light dust collection effect. The process of capable of decomposing and removing this type of contamination by ultraviolet irradiation is known as ultraviolet ashing such as a semiconductor process. That is, contamination of organic matter of the protective glass 44 caused by ultraviolet rays generated at the time of the laser processing is cleaned by ultraviolet irradiation of the ultraviolet irradiation device 50 radiated under the condition that no contamination is formed.

It is necessary for the ultraviolet irradiation device 50 to radiate ultraviolet rays so as to cover the range in which the contamination adheres. As described above, since the contamination diameter substantially coincides with the optical path diameter of the ultraviolet ray, as long as the position of the ultraviolet irradiation port 51 (an origin of ultraviolet ray) of the ultraviolet irradiation device 50 is located on the processing points P1 (in the case of FIG. 6) and P2 (in the case of FIG. 7) or on the side closer to the protective glass 44 than the processing points P1 and P2, ultraviolet rays can be radiated to cover the contamination range. That is, it is also proved from the examples of FIG. 6 and FIG. 7 that the entire adhesion range can be covered, by setting the cleaning position of the laser head 40 so that the ultraviolet irradiation port 51 of the ultraviolet irradiation device 50 is located at a position corresponding to the processing point P or a position on side closer to the protective glass 44 than that position at the time of processing of the laser processing machine 1.

Next, an effect of supplying the cleaning gas will be described. In the UV ashing (cleaning using the ultraviolet irradiation), the organic matter is decomposed through two stages described in the following Formulas (1) and (2).

$$C_mH_nO_k \rightarrow C_{m'}H_{n'}O_{k'} \qquad (1)$$

$$C_{m'}H_{n'}O_{k'} \rightarrow CO, CO_2, H_2O \qquad (2)$$

Incidentally, in Formulas (1) and (2), m, n, k, m', n', and k' are natural numbers.

Reaction of Formulas (1) and (2) occurs with two necessary factors of the ultraviolet irradiation for causing the organic matter to be decomposed and have low molecular weight and exciting oxygen to generate the active oxygen and a sufficient oxygen atmosphere for oxidizing and volatilizing the organic matter as the active oxygen. In other words, the ultraviolet irradiation using the ultraviolet irradiation device 50 is performed under a suitable condition, that is, under a gas atmosphere (for example, air) containing sufficient oxygen around a cleaning target. As in the above-described embodiment, the supply of $N_2$ is stopped during the cleaning process, and the cleaning process is performed by the cleaning gas under the air atmosphere. In this manner, it is possible to further improve the cleaning effect.

Although preferred embodiments and examples of the present invention have been described above, the present invention is not limited to the above-described embodiments, and can be appropriately modified.

In the above embodiment, the ultraviolet irradiation device 50 is disposed on the side of the conveyor 10, but the configuration is not limited thereto. As long as the ultraviolet irradiation device 50 is at a position which the laser head 40 can be disposed to face, even in other places such as above the conveyor 10, the ultraviolet irradiation device 50 can appropriately change its place to be disposed.

In the above embodiments and examples, an example using a Yb fiber laser has been described, but the type of laser is not limited thereto. For example, the present invention can also be applied to remote laser welding. If plasma generation and organic fumes are present, organic matter adheres to the protective glass with antireflection coating formed by stacking several tens nm of films in multiple layers, and there is a risk that the antireflection function is impaired and the transmittance may be greatly deteriorated. If the present invention is applied to this type of laser processing machine, the transmittance of the protective glass can be kept equal to or greater than the reference, without lowering the operation rate.

EXPLANATION OF REFERENCE NUMERALS

1 LASER PROCESSING MACHINE
10 CONVEYOR (WORKPIECE CONVEYING DEVICE)
11 CONVEYOR DRIVE MOTOR (DRIVING MECHANISM)
20 LASER MOVING DEVICE (MOVING MECHANISM)
40 LASER HEAD
43 FLOW PATH
45 LASER IRRADIATION PORT
50 ULTRAVIOLET IRRADIATION DEVICE
51 ULTRAVIOLET IRRADIATION PORT
60 CLEANING GAS FLOW PATH
61 SWITCHOVER VALVE
W WORKPIECE

The invention claimed is:

1. A laser processing machine, said machine comprising:
a conveyor driving mechanism;
a workpiece conveying device;
a laser head moving mechanism;
a laser head that is supported by the laser head moving mechanism so as to be movable above the workpiece conveying device in XY in-plane directions with respect to the workpiece conveying device, and in a Z direction perpendicular to the XY in-plane directions, the laser head having a protective glass plate therein for protecting a laser focus lens;
an ultraviolet irradiation device disposed above the workpiece conveying device or beside the workpiece conveying device, wherein a laser beam axis of the laser head and an ultraviolet beam axis of the ultraviolet irradiation device are configured to be parallel to each other; and a control device, wherein the machine is configured and arranged such that during laser processing, the control device controls the conveyor driving mechanism to drive the workpiece conveying device, controls the laser head moving mechanism to adjust a position of the laser head, and controls the laser head to radiate laser beams on the workpiece conveyed by the workpiece conveying device wherein the ultraviolet irradiation by the ultraviolet irradiation device is performed in an idle time during which the workpiece is not cut by laser irradiation from the laser head, and wherein, during cleaning processing, the control device:

controls the laser head moving mechanism to move the laser head to a cleaning position above or at a side of the workpiece conveying device, and to cause a laser irradiation port of the laser head to face an ultraviolet irradiation port of the ultraviolet irradiation device, such that at the cleaning position, the laser beam axis and the ultraviolet beam axis coincide with each other; and controls the ultraviolet irradiation device to radiate ultraviolet rays on the protective glass plate, such that the protective glass plate is cleaned without being removed from the laser head.

2. The laser processing machine according to claim 1, wherein the ultraviolet irradiation port is disposed either at the same position as a laser processing point of the laser head, or at a position closer to the protective glass plate than the laser processing point in the Z direction, when the ultraviolet irradiation device radiates ultraviolet rays.

3. The laser processing machine according to claim 1, wherein the laser head has a flow path formed therein for supplying a cutting gas which is injected during the laser processing, and wherein the cutting gas is supplied to the flow path during laser irradiation, and supply of the cutting gas is stopped during ultraviolet irradiation.

4. The laser processing machine according to claim 3, wherein a cleaning gas flow path is connected, via a switchover valve, to the flow path for supplying the cutting gas, and wherein, during the ultraviolet irradiation, a cleaning gas is introduced from the cleaning gas flow path and the cutting gas is purged from inside of the flow path.

* * * * *